Figure 1:
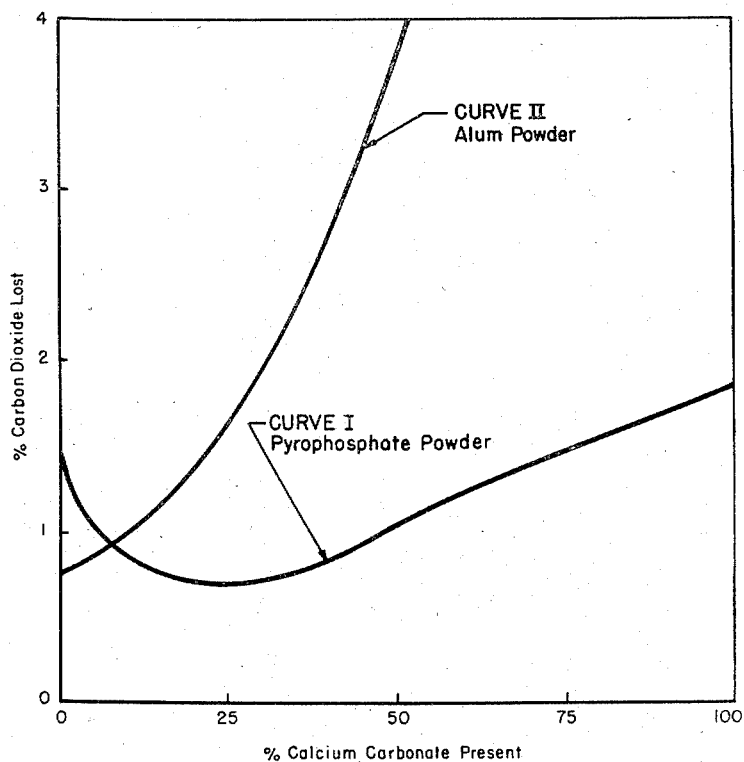

Patented Dec. 5, 1950

2,532,281

UNITED STATES PATENT OFFICE 2,532,281

PYROPHOSPHATE BAKING POWDER

William E. Barch, New York, N. Y., assignor to Standard Brands Incorporated, New York, N. Y., a corporation of Delaware Application October 15, 1947, Serial No. 779,911

7 Claims. (Cl. 99—95)

This invention relates to pyrophosphate baking powders having improved keeping qualities.

Baking powders contain as essential ingredients an acid-reacting material and sodium bicarbonate, with or without a filler. The acid-reacting materials customarily used are alum, tartaric acid or its acid salts, and acid salts of phosphoric acid, or combinations of these materials. Acid pyrophosphates are not ordinarily used because of their exceptionally poor keeping qualities.

The filler serves several functions. In insures thorough mixing of the reactive ingredients, thereby promoting a gradual evolution of gas. It absorbs moisture which may be inadvertently incorporated in the mixture. The filler's contribution to the bulk of the powder facilitates handling and measuring for actual use.

The filler is generally starch or flour. Starch has long been accepted as the most satisfactory filler because flour has a tendency to cause rancidity as a result of its fat content. Starch is also characterized by a marked preservative action upon the powder. It is believed that starch coats the individual particles of the reactive ingredients and thus helps to prevent them from interacting with each other prematurely.

In recent years an attempt has been made to develop substitutes for starch because of a short supply. The use of calcium carbonate for this purpose in alum, cream of tartar and acid phosphate powders have been described in the Journal of the American Dietetic Association, volume 21, pages 611 to 615 (1945), in the Oil, Paint and Drug Reporter for January 17, 1944 and in Bulletin No. 504, dated January 10, 1944, the Grocery Manufacturers of America, Inc. However, although calcium carbonate possesses many of the desirable qualities of a good filler, it has been found that the baking powders in which it has been used deteriorate more rapidly than starch-filled baking powders. The rate of deterioration increases in direct proportion to the amount of calcium carbonate present. Because of the marked deterioration-accelerant properties thus demonstrated and supposed to be inherent in its nature, calcium carbonate has not come into general commercial use.

It has now been found that the rate of deterioration of a calcium carbonate-filled baking powder depends not upon some inherent property of calcium carbonate but upon both the nature of the acid-reacting component of the baking powder and the amount of calcium carbonate used. By employing an acid pyrophosphate as the principal or major acid-reacting component and by employing calcium carbonate in part replacement of the starch, flour or other filler, in amounts limited to between 7% and 75% of the total filler present, a baking powder may be obtained having better keeping qualities than a baking powder containing starch as the only filler. Under these particular conditions calcium carbonate acts as a deterioration-retardant for the baking powder.

To give a fast initial rate of reaction, another acid-reacting component may be employed in part replacement of the acid pyrophosphate in an amount less than the amount of acid pyrophosphate. Such components include tartaric acid and its acid salts such as potassium acid tartrate and sodium acid tartrate, adipic acid, mucic acid, fumaric acid and their acid salts, mono sodium phosphate, mono potassium phosphate and mono calcium phosphate.

Since calcium carbonate exerts a preservative effect only on the acid pyrophosphate, and exerts a deteriorative effect on other acid-reacting components, the powder containing other acid-reacting components will generally have poorer keeping qualities than one in which an acid pyrophosphate is the only acid component. The decrease in keeping qualities has been found to be in direct proportion to the amount of other acid-reacting component. It may however be partially overcome if the particle size of this component is large enough. When mono calcium phosphate is employed not more than 75% of this salt should be less than one hundred mesh size.

Figure 1 shows graphically the relative keeping qualities of typical pyrophosphate (curve I) and alum (curve II) baking powders having calcium carbonate and/or starch as the filler. The percent carbon dioxide lost by each of the powders under the same storage conditions is plotted against the percent calcium carbonate by weight of the filler present in the powder.

The practice of the invention is illustrated in the following examples:

Example 1

Pyrophosphate baking powders having the following formulations were prepared:

|  | A | B | C | D |
|---|---|---|---|---|
|  | Percent | Percent | Percent | Percent |
| Sodium acid pyrophosphate | 38.0 | 38.0 | 38.0 | 38.0 |
| Sodium bicarbonate | 28.0 | 28.0 | 28.0 | 28.0 |
| Starch | 34.0 | 25.5 | 17.0 |  |
| Calcium carbonate (8 to 10 microns) |  | 8.5 | 17.0 | 34.0 |
| Carbon dioxide lost | 1.44 | 0.67 | 1.02 | 1.84 |

The deterioration of these baking powders on storage was measured by loss of carbon dioxide in a standard accelerated shelf-like test, which was conducted as follows:

One gram samples of each formulation were weighed in Chittick carbon dioxide analysis flasks. The flasks were tapped to distribute the sample evenly over the bottom and their necks plugged with cotton. They were then heated in an oven at 95° F. and 95% relative humidity for six hours. The flasks were then removed from the oven and the amount of carbon dioxide theoretically available in the powder determined in a standard Chittick apparatus. The percent carbon dioxide lost is the difference between the per cent carbon dioxide theoretically available in the original powder and the per cent carbon dioxide found by analysis to be theoretically available after this test. The per cent carbon dioxide lost was plotted against per cent calcium carbonate present to give curve I of Figure 1.

Curve I of Figure 1 shows that calcium carbonate acts as a deterioration-accelerant for pyrophosphate baking powders when used in an amount in excess of approximately 75% of the filler. When the amount of calcium carbonate is between 10% and 50% of the filler, the powder has approximately twice the shelf-life of a powder of the same formulation having starch as the sole filler. Between 7% and 75% calcium carbonate gives a significant increase in shelf-life.

*Example 2*

Acid phosphate-pyrophosphate baking powders having the following formulations were prepared:

|  | A | B | C | D |
| --- | --- | --- | --- | --- |
|  | Percent | Percent | Percent | Percent |
| Sodium acid pyrophosphate | 36.0 | 40.5 | 36.0 | 35.0 |
| Monocalcium phosphate (100 mesh) | 4.0 | 3.3 |  |  |
| Monocalcium phosphate (200 mesh) |  |  | 4.0 |  |
| Monocalcium phosphate (50%—200 mesh, 50%—100 mesh) |  |  |  | 4.0 |
| Sodium bicarbonate | 29.0 | 26.2 | 29.0 | 29.0 |
| Starch | 15.0 | 30.0 | 15.0 | 15.0 |
| Calcium carbonate (8 to 10 microns) | 16.0 |  | 16.0 | 16.0 |
| Carbon dioxide lost | 0.68 | 1.48 | 2.02 | 0.92 |

The application of the standard accelerated shelf-life test to these formulations showed the importance of the particle size of monocalcium phosphate employed, superimposed upon the critical proportions of calcium carbonate.

Formulation A had over twice the stability of formulation B, which had starch as the only filler, when the monocalcium phosphate employed was 100 mesh. Formulation A thus shows the effect of replacing approximately 50% by weight of the starch filler with calcium carbonate. However, when 200 mesh mono-calcium phosphate was employed (formulation C) instead of 100 mesh monocalcium phosphate (formulation A), the stability of the powder was nearly 50% worse than that of formulation B, the powder which contained no calcium carbonate. Moreover, the stability of formulation C was over three times worse than that of formulation A, even though both powders contained the same quantity of calcium carbonate.

Formulation D employed a mixture of 50% 100 mesh and 50% 200 mesh monocalcium phosphate with good results. Actually up to but not over 75% of the monocalcium phosphate used may be less than 100 mesh size. Preferably all of the monocalcium phosphate is 100 mesh size or larger.

Baking tests were run on formulations A and B. Batters for yellow layer cakes, white cakes and devil's food cakes were prepared, and their pH, general appearance, flavor, and change with age were noted. Also, the crumb color, grain, texture, and flavor of the cakes baked from these batters were noted. These properties were practically identical in all cases for both formulations A and B. Thus there is little or no difference between starch and calcium carbonate in their effect on the rate of reaction of the ingredients composing the baking powder, or on other batter-forming and baking properties of the powder.

The improvement obtained by substitution of sodium acid pyrophosphate for alum in a powder formulation of this type containing monocalcium phosphate is illustrated by the following formulations. The results obtained with alum typify those obtained with tartaric acid and its salts, and with acid phosphate salts alone.

|  | A | B | C |
| --- | --- | --- | --- |
|  | Per cent | Per cent | Per cent |
| Alum | 24 | 24 | 24 |
| Monocalcium phosphate (100 mesh) | 9 | 9 | 9 |
| Sodium bicarbonate | 28 | 28 | 28 |
| Starch filler | 39 | 29 | 19.5 |
| Calcium carbonate (8 to 10 microns) |  | 10 | 19.5 |
| Carbon dioxide lost | 0.71 | 1.62 | 3.74 |

The per cent carbon dioxide lost shows that calcium carbonate acts as a deterioration-accelerant in alum baking powders containing monocalcium phosphate. The per cent carbon dioxide lost listed above is plotted against the per cent calcium carbonate in the filler to give curve II of Figure 1.

The following table shows that the per cent total theoretically available carbon dioxide in both these pyrophosphate and alum baking powders is very nearly comparable and summarizes the per cent carbon dioxide lost in the standard accelerated shelf-life test for both powders.

| Per cent CaCO₃ in filler | Pyrophosphate Baking Powder | | Alum Baking Powder | |
| --- | --- | --- | --- | --- |
|  | Available CO₂ (per cent by wt. of powder) | Per cent CO₂ lost | Available CO₂ (per cent by wt. of powder) | Per cent CO₂ lost |
| 0 | 14.6 | 1.44 | 14.6 | 0.71 |
| 25 | 18.4 | 0.67 | 19.0 | 1.62 |
| 50 | 22.1 | 1.02 | 23.4 | 3.74 |
| 100 | 29.6 | 1.84 |  |  |

Thus calcium carbonate when mixed with starch in certain critical proportions improves the keeping qualities of acid pyrophosphate baking powders by 100% or more, while the baking performance is in every respect equal to or better than that of pyrophosphate powders of the same type containing starch as the only filler. Moreover, the product containing a filler comprising 50% calcium carbonate and 50% starch by weight has a 10% greater density and thus 10% less volume than the powder containing 100% starch-filler.

All proportions in the specification and claims are by weight.

I claim:

1. A pyrophosphate baking powder having improved keeping qualities wherein the filler comprises calcium carbonate in an amount between about 7% and about 75% of the total weight of the filler.

2. A baking powder in accordance with claim 1 which contains an acid salt of phosphoric acid in an amount less than the amount of pyrophosphate.

3. A baking powder in accordance with claim 2 in which the acid salt of phosphoric acid is monocalcium phosphate, of which not more than 75% has a particle size less than 100 mesh.

4. A baking powder in accordance with claim 1 which comprises sodium acid pyrophosphate.

5. A baking powder comprising the following ingredients in approximately the stated proportions:

| | Per cent |
|---|---|
| Sodium acid pyrophosphate | 38.0 |
| Sodium bicarbonate | 28.0 |
| Starch | 25.5 |
| Calcium carbonate | 8.5 |

6. A baking powder comprising the following ingredients in approximately the stated proportions:

| | Per cent |
|---|---|
| Sodium acid pyrophosphate | 36.0 |
| Monocalcium phosphate (100 mesh) | 4.0 |
| Sodium bicarbonate | 29.0 |
| Starch | 15.0 |
| Calcium carbonate | 16.0 |

7. A pyrophosphate baking powder having improved keeping qualities wherein the filler consists essentially of starch and calcium carbonate, the calcium carbonate being present in an amount between about 7% and about 75% of the total weight of the filler.

WILLIAM E. BARCH.

REFERENCES CITED

The following references are of record in the file of this patent:

UNITED STATES PATENTS

| Number | Name | Date |
|---|---|---|
| 1,538,910 | Stokes | May 26, 1925 |
| 2,062,064 | Knox et al. | Nov. 24, 1936 |
| 2,160,701 | Knox | May 30, 1939 |
| 2,394,791 | Lloyd | Feb. 12, 1946 |
| 2,408,258 | Hetzel | Sept. 24, 1946 |

FOREIGN PATENTS

| Number | Country | Date |
|---|---|---|
| 20,891 | Great Britain | of 1896 |
| 550,539 | Great Britain | Acc. 1943 |
| 552,811 | Great Britain | Acc. Sept. 11, 1942 |

OTHER REFERENCES

Lowe, Experimental Cookery, (2nd) 1937, John Wiley and Sons, pp. 451, 452.

Chittick, Oil Paint & Drug Reporter, January 17, 1944, page 57.

Melnick, Jour. Am. Dietetic Ass'n, 2, #9, November 1945, pp. 611 to 615.